R. YOUNG.
VEHICLE TOP RAISING AND LOWERING MECHANISM.
APPLICATION FILED FEB. 27, 1914.

1,149,013.

Patented Aug. 3, 1915.
2 SHEETS—SHEET 1.

Witnesses
F. C. Gibson.
V. B. Hillyard.

Inventor
Rush Young.

By Victor J. Evans
Attorney

R. YOUNG.
VEHICLE TOP RAISING AND LOWERING MECHANISM.
APPLICATION FILED FEB. 27, 1914.
1,149,013.
Patented Aug. 3, 1915.
2 SHEETS—SHEET 2.
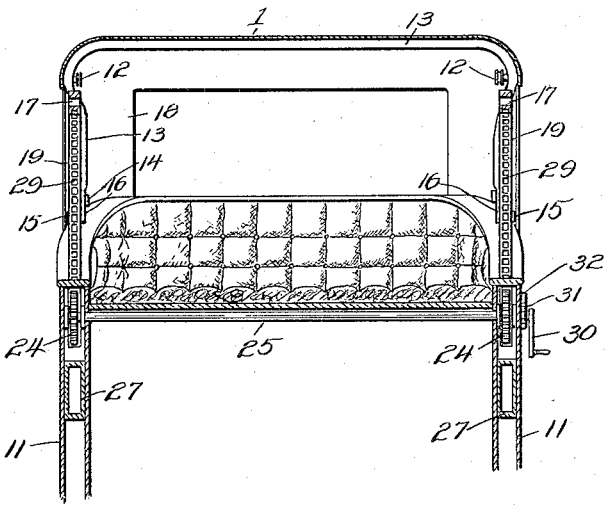
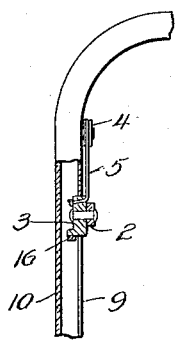
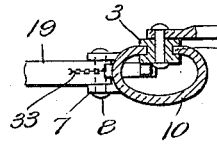
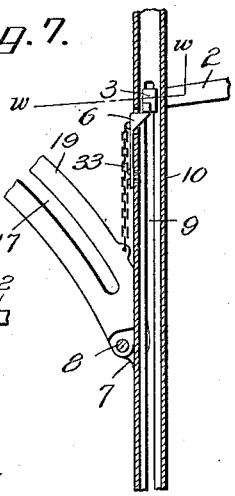
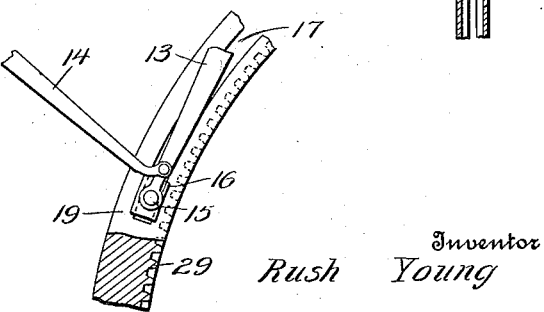
Inventor
Rush Young
Witnesses
F. C. Gibson.
V. B. Hillyard.
By Victor J. Evans
Attorney

UNITED STATES PATENT OFFICE.

RUSH YOUNG, OF VEEDERSBURG, INDIANA.

VEHICLE TOP RAISING AND LOWERING MECHANISM.

1,149,013. Specification of Letters Patent. Patented Aug. 3, 1915.

Application filed February 27, 1914. Serial No. 821,505.

*To all whom it may concern:*

Be it known that I, RUSH YOUNG, a citizen of the United States, residing at Veedersburg, in the county of Fountain and State of Indiana, have invented new and useful Improvements in Vehicle Top Raising and Lowering Mechanism, of which the following is a specification.

Persons operating and using vehicles provided with folding tops are familiar with the annoyance attendant upon the raising and lowering of such tops and usually the operation cannot be safely and successfully effected by one person and as a result the tops are not raised or lowered at proper times hence the tops are left raised when it would otherwise be desirable to have the same lowered and such tops are left lowered when it would be advantageous to have the same raised.

The present invention provides means whereby one person may manipulate the top with ease and despatch both to raise or lower the same, such means being arranged in a manner not to interfere with or detract from the appearance of the machine or require any special formation of body, the invention being of such a nature as to be readily adapted to the various makes of vehicles, automobiles and the like in use upon the market.

The invention consists of the novel features, details of construction and combination of parts, which hereinafter will be more particularly set forth, illustrated in the accompanying drawings and pointed out in the appended claims.

Figure 1:
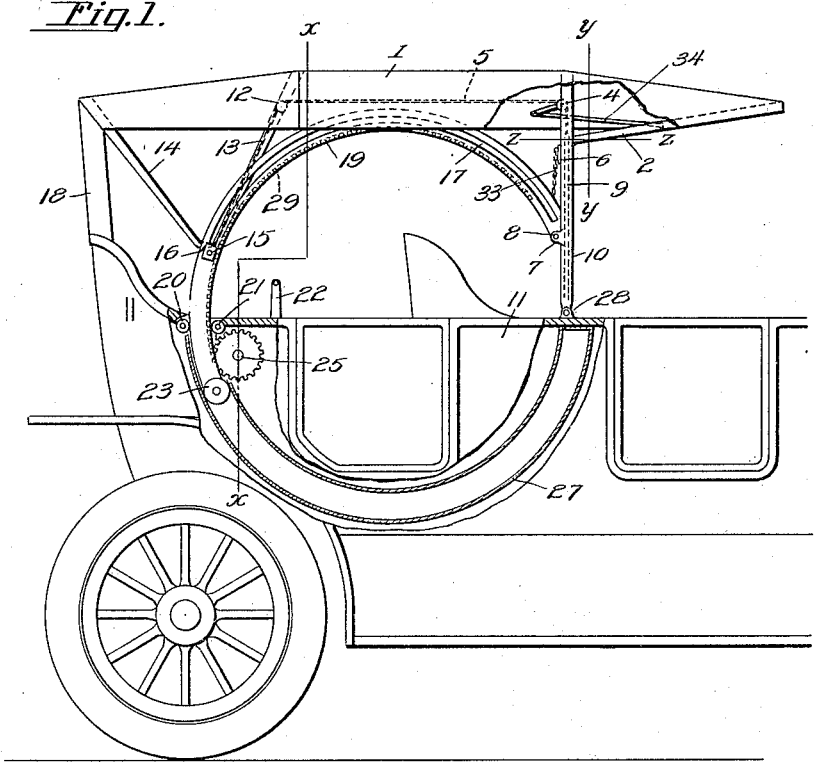
Figure 2:
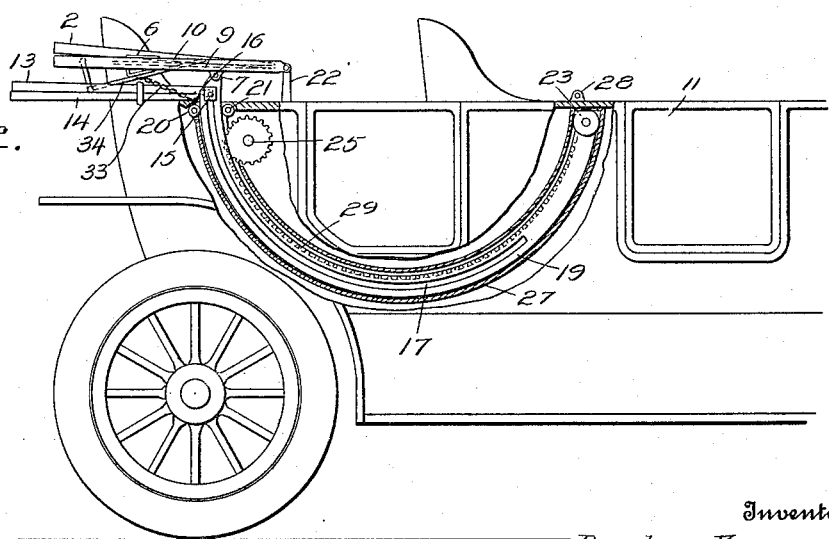

Figure 1 is a side view of a folding vehicle top embodying the invention showing the relation of the parts when such top is raised. Fig. 2 is a view of the parts shown in Fig. 1 illustrating the position of the elements when the top is lowered. Fig. 3 is a transverse section on the line *x—x* of Fig. 1. Fig. 4 is a transverse section on the line *y—y* of Fig. 1. Fig. 5 is a horizontal section on the line *w—w* of Fig. 7. Fig. 6 is a detail view of a portion of one of the curved side bars and the rear supports attached thereto. Fig. 7 is a detail view of the front portion of one of the curved side bars and the front top supports, showing the catches and flexible connection between the catch and side bars.

Corresponding and like parts are referred to in the following description and indicated in all the views of the drawings, by the same reference characters.

The body of the vehicle, machine or the like is indicated at 11 and is shown as being of the type embodying front and rear seats. The top comprises a cover 1, back guard 18 and supports 2, 10, 13 and 14. These several supports are of the general form of bows. The front support or bow 10 has the lower ends of its side members detachably connected with the body or other convenient part of the vehicle or machine in any usual way to admit of such bow being carried rearward or forward as is required when lowering or raising the top. The support or bow 2 performs the function of a brace and holds the front portion of the cover 1 extended. The side members of the bow 2 have a sliding connection with the side members of the bow 10, the extremities of the bow 2 having extensions 3 to enter and coöperate with guides 9 formed in the side members of the bow 10. When the top is raised and properly stretched the extremities of the bow 2 occupy a position at the upper ends of the guides 9 and are held elevated by means of spring catches 6. When the top is lowered the ends of the bow 10 are disconnected from the front brackets 28 and are engaged with rear brackets 22 as indicated most clearly in Fig. 2. Flexible connections 5 have their rear ends attached to the bows 13 and passing over guide rollers 12 and have their forward portions passed over guide rollers 4 near the upper end of the bow 10 and made fast to the lower rear ends of the side members of the bow 2. When the top is raised and properly stretched the connections 5 are under tension as indicated in Fig. 1. The length of the flexible connections 5 is such as to insure a movement of the ends 3 of the bow 2 so as to occupy a position at the upper ends of the guides 9. The ends 3 being automatically moved in the guides 9 as the top is raised.

Curved bars 19 are pivotally connected at their front ends to brackets 7 carried by the bow 10, the pivot fastenings being indicated at 8. The bars 19 are formed on the arc of a circle and such bars are arranged to operate in guide ways 27 at the sides of the vehicle body. The bars 19 are of a length so that when the top is raised their lower rear ends partly enter the guide ways 27. Rollers 23 are mounted upon the lower rear ends of the bars 19 and are arranged to travel in the guide ways 27. Rollers 20 and 21 are located upon opposite sides of the entrance of each of the guide ways 27 and prevent binding of the bars 19 when the top is raising or lowering. The bows 13 and 14 are pivotally connected at 15 and extensions 16 project from one of the bows and are arranged to operate in guide ways 17 formed in the bars 19. The guide ways 17 are of a length to admit of a limited movement of the bars 19 in each direction without producing a movement of the bows 13 and 14. When the top is raised the extensions 16 engage the rear ends of the guide ways 17. When the top is lowered the extensions 16 engage the closed ends at the front of the guide ways 17. When lowering the top the several bows move together until the rear bow 14 engages the upper edge of the vehicle body when the bars 17 are adapted to continue in their movement to carry the bow 10 rearward and fold the same upon the bows 13 and 14. When raising the top the bow 10 is carried upward and forward a distance before movement is imparted to the bows 13 and 14 and when the bow 10 has moved a distance to cause the rear ends of the guide ways 17 to engage with the extensions 16 the bows 13 and 14 are carried upward and forward. As the bow 10 moves forward the lower rear end of the bow 2 is caused to rise in the guide ways 9 by reason of the flexible connections 5 in the manner hereinbefore stated.

The bars 19 are positively moved in any manner and for convenience a shaft 25 extends transversely of the vehicle and is provided at its ends with gear wheels 24 which mesh with teeth 29 formed on the lower edges of the bars 19. The shaft 25 is located at the front edge of the rear seat so as to be out of the way and one of its ends is extended to receive a crank 30 by means of which the shaft is rotated when it is required to effect a raising or lowering of the top. A ratchet wheel 31 attached to one end of the shaft 25 coöperates with a pawl 32 thereby holding the shaft 25 and the top in the required adjusted position.

When it is required to lower the top the lower ends of the side members of the bow 10 are disengaged from the brackets 28 and the pawl 32 is released from the ratchet wheel 31 after which the shaft 25 is turned by means of the crank 30 to cause the bars 17 to enter the guide ways 27. The first movement of the bars 19 carries all the supports rearward and when the bow 14 comes in contact with the upper edge of the vehicle body its further movement is arrested. A continued movement of the bars 19 carries the bow 10 rearward until the same rests upon the bow 13 at which time the lower ends of the side members of the bow 10 are engaged with the brackets 22. The bow 2 is released from the catches 6 and is drawn downward in the guide ways 9, thereby completely folding the top as indicated in Fig. 2. To raise the top the shaft 25 is rotated, thereby projecting the bars 19 from the guide ways 27. The first movement of the bars 19 carries the bow 10 upward and forward it being understood that the bow 10 is disengaged from the brackets 22. As the bow 10 moves forward the lower ends of the side members of the bow 2 are drawn upward in the guide ways 9 and at the same time the upper portion of the bow 13 is drawn forward. When the bars 19 move a distance to cause the rear ends of the guide ways 17 to engage with the extension 16 the bows 13 and 14 are carried upward and forward thereby completely raising the top as indicated in Fig. 1.

A flexible connection 33 is interposed between the parts 3 and the front end of the side bar 19. The flexible connection is designed to automatically release the catch 6 from the support 2 and allow the support 2 to collapse when lowering the top and avoid the necessity for releasing the catch 6 by hand. The connection 33 is slack when the top is down, such flexible connection is under tension when the top is moved into a collapsed position and draws the catch 6 out of the path of the extensions 3 and permits the parts 3 to slide downward in the side members 10. The jointed brace 34 connects the upper portion of the part 10 with the part 2. It is to be noted that the part 2 will lie folded on the part 10 until the bar 19 has moved the top half way up. At this point the part 2 begins to move and is drawn forward and caused to spread instead of continuing upward. In other words after the top has been raised to an operative position a downward pressure is exerted upon the brace 34 whereby the extreme forward portion of the top is prevented from being blown upward upon the progressive movement of the vehicle.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new is:—

1. A vehicle body, a top therefor, front and rear supports for the top, an operating member having a guideway, said member having a pivotal connection with the front supports, a connection for the rear supports, said connection being arranged to operate in the guideway of the operating member upon the raising or lowering of the top.

2. A vehicle body, a top therefor, front and rear supports for the top, a curved operating member having a guideway formed therein for the greater portion of its length, said member having a pivotal connection with the front supports, connecting means for the rear supports, said means being arranged to operate in the guideway of the operating member whereby causing a simultaneous operation of the front and rear supports upon movement of said operating member.

3. A vehicle body, a top therefor, front and rear supports for the top, a cover for the top, means slidably mounted in the front supports for holding the front portion of the cover in extended position, and means having connection at one end with the rear supports and at its other end to the former mentioned means for effecting the movement thereof when the top is raised.

4. A vehicle body, a top therefor, front and rear supports for the top, a cover for the top, means slidably mounted in the front supports for holding the front portion of the cover in extended position, means having connection at one end with the rear supports and at its other end to the former mentioned means for effecting the movement thereof when the top is raised, and means for locking the slidably mounted means in the latter mentioned adjusted position.

5. In a folding vehicle top, the combination of top supports, curved bars for moving the top supports to effect a raising or a lowering of the top, such curved bars having toothed portions, a transverse shaft, gear wheels fastened to such shaft and in mesh with the toothed portions of the curved bars and means for imparting rotary movement to the shaft to effect a raising or lowering of the top.

In testimony whereof I affix my signature in presence of two witnesses.

RUSH YOUNG.

Witnesses:
H. N. BILLINGS,
MABEL SUTON.

Copies of this patent may be obtained for five cents each, by addressing the "Commissioner of Patents, Washington, D. C."